H. KRÜGER.
PRESSURE REGULATOR.
APPLICATION FILED DEC. 18, 1909.
953,040.
Patented Mar. 29, 1910.
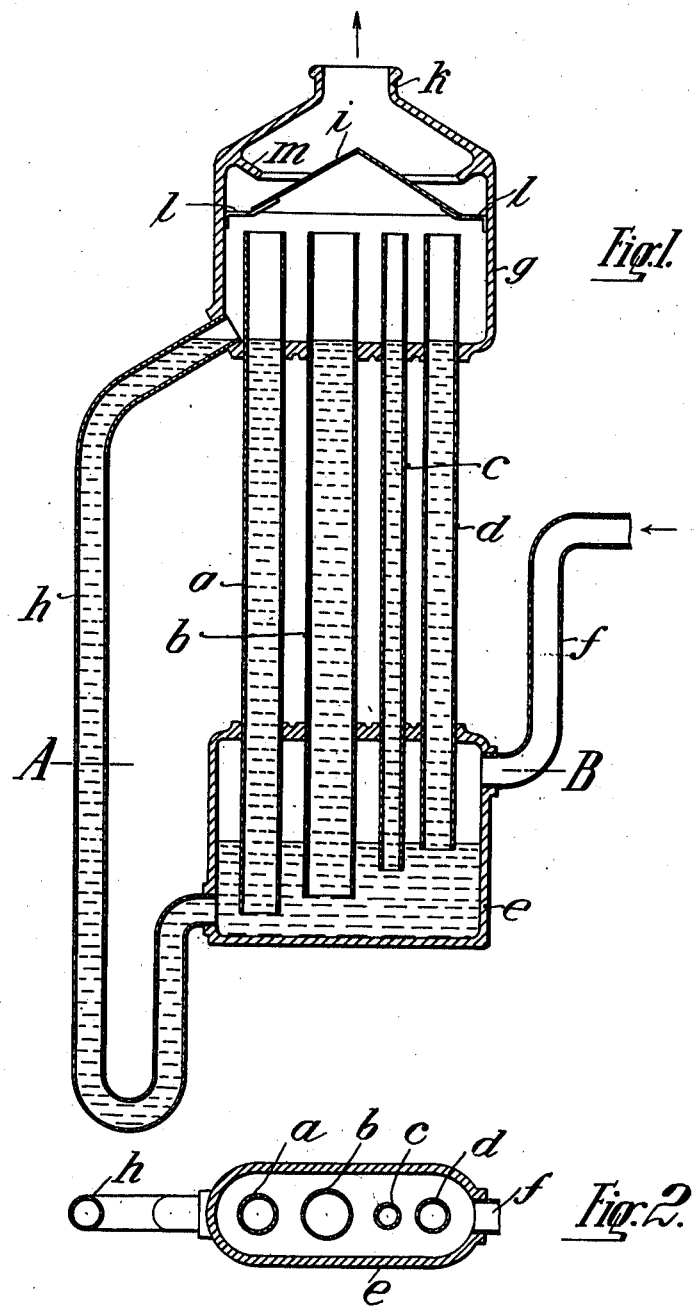

UNITED STATES PATENT OFFICE.

HEINRICH KRÜGER, OF BERLIN, GERMANY.

PRESSURE-REGULATOR.

953,040.

Specification of Letters Patent.   Patented Mar. 29, 1910.

Application filed December 18, 1909. Serial No. 533,813.

*To all whom it may concern:*

Be it known that I, HEINRICH KRÜGER, a citizen of the Empire of Germany, residing at Berlin, in the Empire of Germany, have invented a new and useful Pressure-Regulator, of which the following is a specification.

In the known safety devices with vertical pipes for regulating the pressure in steam boilers the pipe is usually emptied entirely on the pressure exceeding the highest limit, the sealing liquid being expelled from the pipe by the pressure and thrown to without, whereupon the pressure in the boiler will rapidly sink very much below the normal working pressure, so that it takes up very much time, before the working pressure in the boiler is reëstablished.

My invention relates to improvements in such safety-devices, whereby the said defect is avoided.

The improved pressure-regulator acting as a safety-device consists of two vessels, one above the other, and of several vertical pipes of different lengths and diameters connecting the two vessels. The lower vessel is closed and is connected with the upper vessel by a siphon, while it is adapted to be connected with the steam space of the respective steam boiler. The several vertical pipes extend into the upper vessel up to the same height above its bottom, while they, on the contrary, extend into the closed lower vessel to different depths. The upper vessel has a narrow mouth above and is provided with means for preventing the sealing liquid from being thrown to without, and the siphon serves for returning the sealing liquid expelled upward through any vertical pipe by the steam pressure from the upper vessel to the lower vessel, whereby the normal working pressure in the boiler is quickly reëstablished.

I will now proceed to describe my invention with reference to the accompanying drawing, in which—

Figure 1 is a vertical longitudinal section through the pressure-regulator, and Fig. 2 is a horizontal cross section through the same on the line A—B in Fig. 1.

Similar letters of reference refer to similar parts in both views.

The pressure regulator essentially consists of two vessels *e* and *g*, several (here four) vertical pipes *a*, *b*, *c* and *d* air-tightly connecting the two vessels, and a siphon *h*. The pipes *a*, *b*, *c*, and *d* are shown to be different in length and also in area. All of them extend into the upper vessel *g* to the same height above its bottom, but they extend into the lower vessel *e* to decreasing depths as shown. The siphon *h* connects the lower vessel *e* just above its bottom with the upper vessel *g* at its bottom. The upper vessel *g* is shown to be provided with a conical roof *i* supported by a few suitable brackets *l* at a small height above the upper ends of the pipes *a*, *b*, *c* and *d*. Above the annular opening between the roof *i* and the inside of the vessel *g* an annular horizontal rib *m* is disposed and is shown to be cast in one with the vessel *g*. Preferably the rib *m* is inclined inwardly and downwardly, as shown. The lower vessel *e* is to be connected by a suitably bent pipe *f* with the steam space of the respective steam boiler, where a small pressure is to be maintained, such as is for example the case with boilers for heating plants.

When the boiler is cold, the sealing liquid introduced into the lower vessel *e* will have the same level in the latter, the pipes *a*, *b*, *c* and *d*, and the siphon *h*, which level may be about at the same height as the line A—B in Fig. 1. On the boiler being heated, the normal working pressure produced in it will force the sealing liquid out of the lower vessel *e* into the pipes *a*, *b*, *c*, *d* and the siphon *h*, say up to the level shown at Fig. 1, while the level in the lower vessel *e* may be just above the lower end of the shortest pipe, that is the pipe *d*, as shown. As is well known, the head of the liquid in the pipes, that is the difference between the two levels, determines the pressure in the boiler. When the pressure in the boiler rises, it will force the level of the liquid in the lower vessel *e* farther downward, until the lower end of the pipe *d* is uncovered and the steam is permitted to enter the pipe *d*, when it will expel the liquid therein upward and escape through the mouth *k* in the direction of the arrow. The liquid expelled is caught by the roof *i*, so that it flows into the upper vessel *g*. Any spurting liquid will be caught by the rib *m* and returned downward. The liquid will collect on the bottom of the upper vessel *g*, whereby the head of the liquid is a little increased. The steam may continue to escape through the pipe *d* until its pressure has sunk to the normal size. If, however, the pressure in the boiler further rises, the lower end of the second pipe *c* will be uncovered, so that steam can enter it and expel from it the liquid contained in it, after which the steam passes through it upward. It may be preferable to make the second pipe *c* smaller in area than the first pipe *d*, so as to prevent the pressure of the steam from sinking too rapidly beneath the normal size, whereby otherwise disturbances in the respective plant might be created. If the pressure still further rises, it will force the level in the lower vessel *v* farther downward, so that the lower end of the third pipe *b* and perhaps that of the fourth pipe *a* is uncovered and steam will enter these pipes and expel the liquid from them before escaping. The third pipe *b* is shown to be larger in area than the two first pipes *d* and *c*, so as to retard as much as possible the emptying of the vessel *e* through the siphon *h*. The liquid expelled from the several pipes *d*, *c*, *b*, and collecting in the upper vessel *g* is permitted to return through the siphon *h* to the lower vessel *e* on the steam pressure falling to normal. It will be seen, that by this arrangement of the pressure regulator all disturbances in the management of the respective plant are avoided as far as is possible.

I have shown the level of the sealing liquid in the tubes and siphon to be normally at the same height as the bottom of the upper vessel *g*, but I desire it expressly to be understood, that I do not bind myself to this level.

The pressure regulator can be varied in many respects without departing from the spirit of my invention.

The several vertical pipes *a*, *b*, *c*, *d* may be made alike in area, or their areas may increase or decrease in any selected order.

I claim:

1. In a pressure regulator of the class described, the combination with a lower closed vessel adapted to be connected with the steam space of a boiler, of an upper vessel open at the top, a plurality of vertical pipes air-tightly connecting said lower vessel with said upper vessel and extending into the upper vessel to the same height above the bottom, but extending into the lower vessel to different depths, and a siphon connecting said lower vessel at its bottom with said upper vessel at its bottom.

2. In a pressure regulator of the class described, the combination with a lower closed vessel adapted to be connected with the steam space of a boiler, of an upper vessel with a narrow mouth at the top, a plurality of vertical pipes air-tightly connecting said lower vessel with said upper vessel and extending into the upper vessel to the same height above the bottom, but extending into the lower vessel to different depths, a siphon connecting said lower vessel at its bottom with said upper vessel at its bottom, a sealing liquid in said lower vessel, and means in said upper vessel adapted to catch any sealing liquid expelled from the lower vessel through any vertical pipe by the steam pressure.

HEINRICH KRÜGER.

Witnesses:
 WOLDEMAR HAUPT,
 HENRY HASPER.